US 8,052,558 B2
Nov. 8, 2011

(12) United States Patent
Markley

(10) Patent No.: US 8,052,558 B2
(45) Date of Patent: Nov. 8, 2011

(54) FORCE LIMITING TENSIONING ARM

(75) Inventor: George L. Markley, Montour Falls, NY (US)

(73) Assignee: BorgWarner Inc., Auburn Hills, MI (US)

( * ) Notice: Subject to any disclaimer, the term of this patent is extended or adjusted under 35 U.S.C. 154(b) by 598 days.

(21) Appl. No.: 12/278,982

(22) PCT Filed: Jan. 30, 2007

(86) PCT No.: PCT/US2007/061279
§ 371 (c)(1),
(2), (4) Date: Aug. 11, 2008

(87) PCT Pub. No.: WO2007/095420
PCT Pub. Date: Aug. 23, 2007

(65) Prior Publication Data
US 2009/0275430 A1    Nov. 5, 2009

Related U.S. Application Data

(60) Provisional application No. 60/774,360, filed on Feb. 17, 2006.

(51) Int. Cl.
*F16H 7/08*    (2006.01)
(52) U.S. Cl. ........................................... 474/111
(58) Field of Classification Search .................. 474/101, 474/109, 110, 111, 140
See application file for complete search history.

(56) References Cited

U.S. PATENT DOCUMENTS

| 4,826,468 | A | 5/1989 | Friedrichs |
| 5,730,674 | A | 3/1998 | Ott |
| 5,797,818 | A | 8/1998 | Young |
| 5,993,342 | A | 11/1999 | Wigsten et al. |
| 6,612,952 | B1 * | 9/2003 | Simpson et al. .............. 474/111 |
| 7,476,168 | B2 * | 1/2009 | Markley et al. .............. 474/111 |
| 7,479,077 | B2 * | 1/2009 | Markley et al. .............. 474/111 |
| 7,597,640 | B2 * | 10/2009 | Markley et al. .............. 474/111 |
| 7,628,719 | B2 * | 12/2009 | Markley .......................... 474/111 |
| 7,641,577 | B2 * | 1/2010 | Markley et al. .............. 474/111 |
| 2002/0042315 | A1 * | 4/2002 | Poiret ............................ 474/111 |
| 2005/0143207 | A1 | 6/2005 | Hashimoto et al. |

* cited by examiner

*Primary Examiner* — Michael Mansen
*Assistant Examiner* — Juan Campos, Jr.
(74) *Attorney, Agent, or Firm* — Brown & Michaels, PC

(57) ABSTRACT

A tensioner for a chain driven power transmission system of an internal combustion engine, having a ratchet as part of the tensioning system is disclosed. The tensioner contains at least one bracket that is pivotally mounted to the engine adjacent one strand of the chain. The bracket contains a chain guide element that maintains forceful slideable engagement with the chain. Between the chain guide element and the bracket are an elongated support member having a pre-loaded spring force and an elongated resilient pad. The resilient pad quickly compresses in response to spikes or surges in chain tension absorbing the force of the spike.

11 Claims, 11 Drawing Sheets

PRIOR ART

PRIOR ART

FORCE LIMITING TENSIONING ARM

REFERENCE TO RELATED APPLICATIONS

This application is a continuation in part of application Ser. No. 11/168,049, filed on Jun. 28, 2005, entitled "Pivoting Mechanical Tensioner With A Compliant Blade Spring". Further, this application claims one or more inventions which were disclosed in Provisional Application No. 60/774,360, filed Feb. 17, 2006, entitled "Force Limiting Tensioning Arm". The benefit under 35 USC §119(e) of the United States provisional application is hereby claimed. The aforementioned applications are hereby incorporated by reference.

BACKGROUND OF THE INVENTION

1. Field of the Invention

The invention pertains to the field of tensioners used in chain drive power transmission systems. More particularly, the invention pertains to the use of a resilient pad in combination with an optional pre-loaded spring under a chain sliding face to carefully regulate spikes or excessive surges in chain tension.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that at any point in time, part of the chain is slack and part of the chain is tight. In the case of a chain engaging toothed sprockets, it is important to impart and maintain a certain degree of tension to the chain to prevent noise, slippage, or the unmeshing of teeth from any of the sprockets. Prevention of such slippage is particularly important in the case of a chain driven camshaft in an internal combustion engine because the jumping of teeth will throw off the camshaft timing, causing damage to the power transmission system or possibly rendering the engine inoperative.

However, in the harsh environment of an internal combustion engine, various factors can cause fluctuations in chain tension. For instance, wide variations in temperature and thermal expansion coefficients among the various parts of the engine can cause chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example during stopping of the engine or in failed attempts at starting, can also cause extreme spikes or surges in chain tension. For these reasons, a mechanism is desired to remove excessive tensioning forces on the tight side of the chain and to ensure that adequate tension is provided on the slack side of the chain.

Blade tensioners are tensioners may be used to control a chain or belt where load fluctuations are not so severe as to excessively flex the spring or springs. A ratchet with backlash may be added to such tensioners to limit the effective backward or untensioned travel of the tensioning device.

Referring to FIG. 1 an example of a typical blade tensioner is shown. The blade tensioner 110 includes a blade shoe 111 made of resin having a curved chain sliding face and, in this example, numerous blade springs 121, preferably all made of a metallic material. The blade springs 121 are arranged in layers on the opposite side of the blade shoe 111 from the chain sliding face, and provide spring force to the blade shoe 111. The ends of each blade spring 121 are inserted in the indented portions 114 and 115, which are formed in the distal portion 112 and proximal portion 113 of the blade shoe 111, respectively. A bracket 117 is provided for mounting the blade tensioner 110 in an engine. Holes 118 and 119 are formed in the bracket 117, and mounting bolts are inserted into these holes 118 and 119. A sliding face 116 contacts the distal portion of the blade shoe 111 and permits sliding. The slide face 116 is formed on the distal portion of the bracket 117. A pin 120 supports the proximal portion 113 of the blade shoe 111 so that it may move in either direction. The pin 120 is secured on the bracket 117.

FIG. 2 shows a chain tensioning device that has a pair of arms 202, 203 which are joined by a pivot 204. The arms 202, 203 are urged apart so that arm 203 applies tensioning force to a chain (not shown) by means of a spring 206 loaded cam block 205. To prevent collapse of arm 203 during load reversals of the chain, a catch disc 209 and rod 208 are arranged to prevent the return movement of the spring loaded cam block 205.

FIG. 3 shows an example of a tensioner with a ratchet device. The ratchet tensioner 301 comprises a tensioner housing 307 having a hole 312 for receiving a piston 308 and a ratchet pawl 317 pivoted by a shaft 316 to the tensioner housing 307 and biased by a ratchet spring 318. The piston 308 has teeth on one outer side that engage a tooth shaped tip of the ratchet pawl 317. The piston 308 is biased out of the hole 312 to contact the tension lever 310 by the combination of adding pressurized hydraulic fluid into the hollow section 313 and the biasing force of the plunger spring 314. The tensioner lever 310 pivots on support shaft 309 and has a shoe surface 311 that contacts and applies tension to the slack side of the timing chain 306 which operatively connects the sprocket 305 of the camshaft 304 with the sprocket 303 of the crankshaft 302. The movement of the piston 308 in and out of the hole 312 is limited by the engagement of the teeth of the ratchet.

Hydraulic tensioners may also be used to maintain proper chain tension. In general, these mechanisms employ a lever arm that pushes against the chain on the slack side of the power transmission system. This lever arm must push toward the chain, tightening the chain when the chain is slack, but must remain rigid when the chain tightens.

To achieve this objective, a hydraulic tensioner 1, as shown in prior art FIG. 4, typically comprises a rod or cylinder as a piston 2, which is biased in the direction of the lever arm by a tensioner spring 3. The piston 2 is housed within a cylindrical housing 5, having an interior space which is open at the end facing the chain and closed at the other end. The interior space of the housing contains a pressure chamber 4 in connection with a reservoir or exterior source of pressurized hydraulic fluid. The pressure chamber 4 is typically formed between the housing 5 and the piston 2, and it expands or contracts as the piston 2 moves within the housing 5.

Typically, valves are employed to regulate the flow of hydraulic fluid into and Out of the pressure chamber. For instance, an inlet check valve such as a ball-check valve opens to permit fluid flow into the pressure chamber 4 when the pressure inside the chamber has decreased as a result of the outward movement of the piston 2. When the pressure in the pressure chamber is high, the inlet check valve closes, preventing fluid from exiting the pressure chamber. The closing of the inlet check valve prevents the piston chamber from releasing hydraulic fluid, which in turn prevents the piston from retracting, achieving a so-called "no-return" function.

Many tensioners also employ a pressure relief mechanism that allows fluid to exit the pressure chamber at a controlled rate when the pressure in the chamber is high, thus allowing the piston to retract in response to rapid increases in chain tension. In some tensioners, the pressure relief mechanism is a spring biased check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

U.S. Pat. No. 5,993,342 discloses a chain tensioner of the hydraulic piston type having an additional feature. The piston provides a tension limiting force on a pivoting lever or arm that is in slideable engagement with a strand of the chain. At the point of contact between the piston and the lever or arm, the end of the piston contains a preloaded compression spring and, optionally, an elastomeric disc or cushion to help control sudden spikes or surges in chain tension. One of the limitations associated with the use of such designs is the increasing amount of space that is needed within the compartment that houses the drive transmission system. This is as the result of the extended length of the piston due to the spring and elastomeric disc added to its contact end.

It is desirable to maintain a substantially constant tension on the chain. It is especially beneficial with respect to the issue of chain wear if the required tensioning forces can be minimized during the times that the engine is off. In the prior art devices detailed above, the hydraulic tensioning systems address this problem by permitting the slow leakage of hydraulic fluid when the engine is shut off thereby allowing the chain tension to slacken gradually. The ratcheting systems address this issue by the inherent presence of backlash in such systems. However, due to design limitations or cost restrictions, backlash may be undesirable or unattainable for certain power transmission systems.

SUMMARY OF THE INVENTION

The present invention is a tensioner for a chain driven power transmission system of an internal combustion engine that includes a tensioning, force biased ratcheting or one-way clutching, mechanism. The tensioner also consists of a tensioning arm placed adjacent the strand of a chain to be tensioned. A chain guide element with a chain sliding surface is positioned on a bracket of the tensioner to forcibly and slidably engage the chain. Between the chain guide element and the tensioner bracket are a resilient pad and, optionally, a pre-tensioned elongated support member which absorb extreme spikes or surges in the tension of the chain.

This invention provides a tensioner which maintains a tension force on the chain that is substantially constant throughout the wide spectrum of tension conditions exhibited by the chain during engine operation, engine shut down and "engine off" modes. The biasing force of the resilient pad and the pre-load of the support member adequately control sudden spikes or surges in chain tension which together eliminate the need for an intricate pressure relief valve or expensive high load bearing chain sliding surface materials that would otherwise be required for tensioners that operate within timing systems that produce high resonance loads.

DETAILED DESCRIPTION OF THE INVENTION

Figure 1:
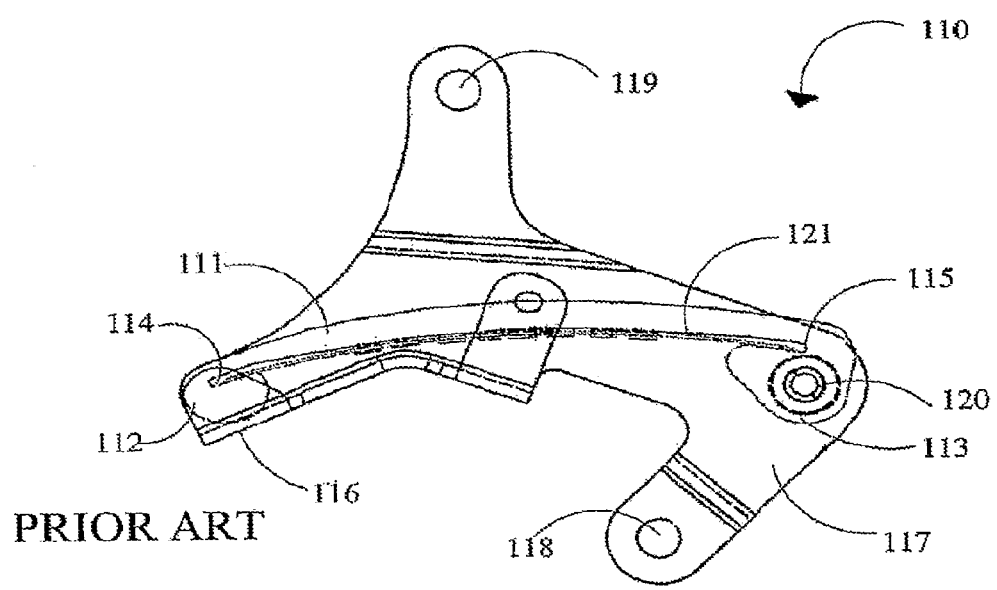
FIG. 1 shows a prior art hydraulic type tensioner that consists of a piston, a tensioned spring to bias the piston in the direction of the chain and ball check valve.
Figure 2:
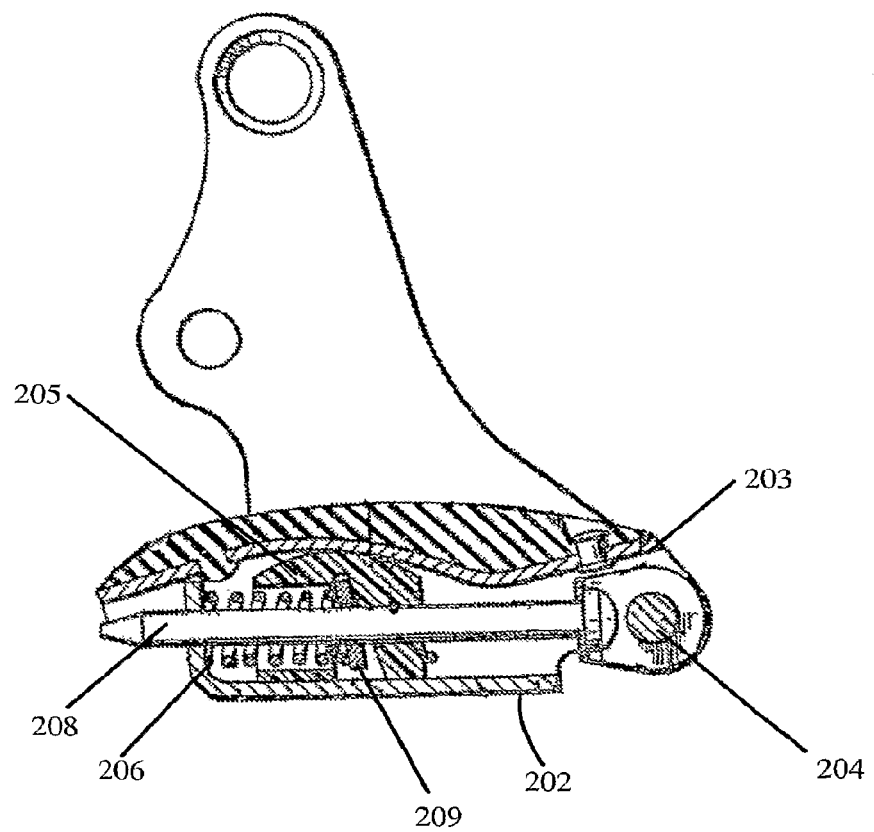
FIG. 2 shows a prior art blade type tensioner.
Figure 3:
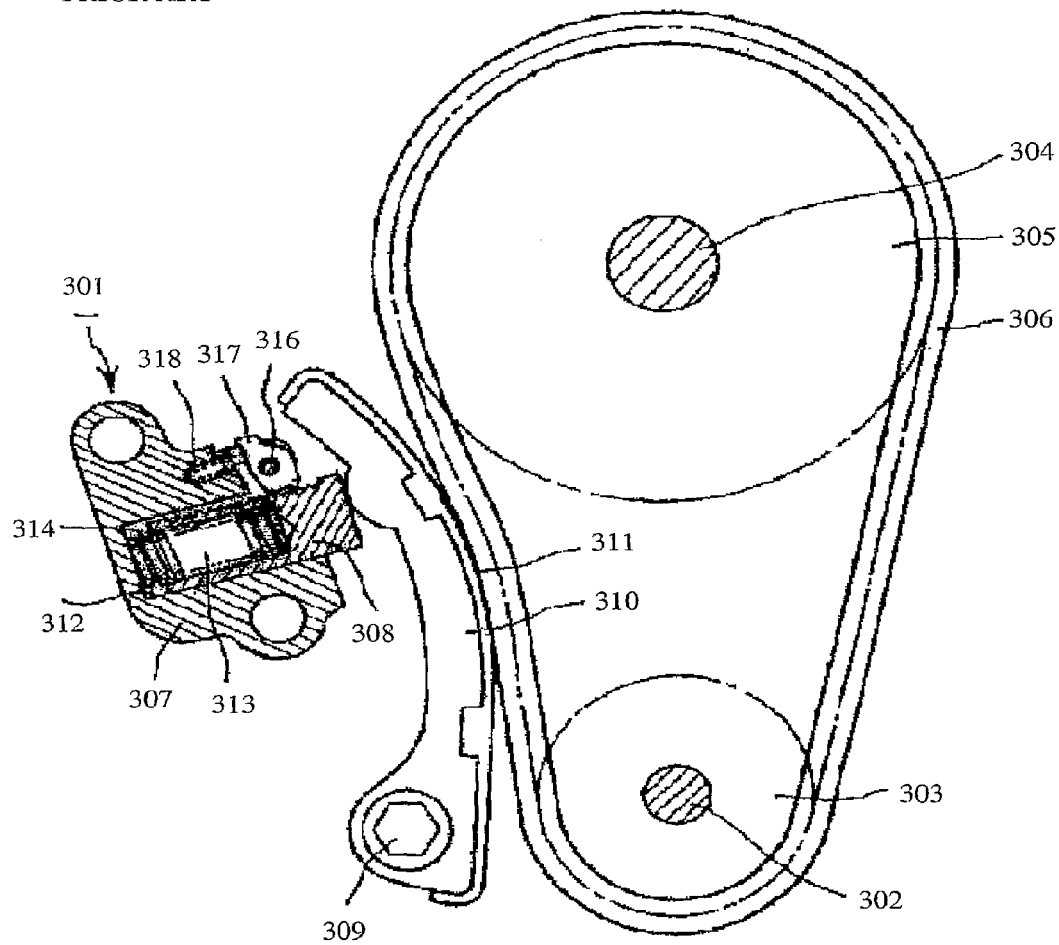
FIG. 3 shows a prior art tensioner having a spring to provide the tensioning force and a catch disc to prevent return movement of the spring loaded cam block.
Figure 4:
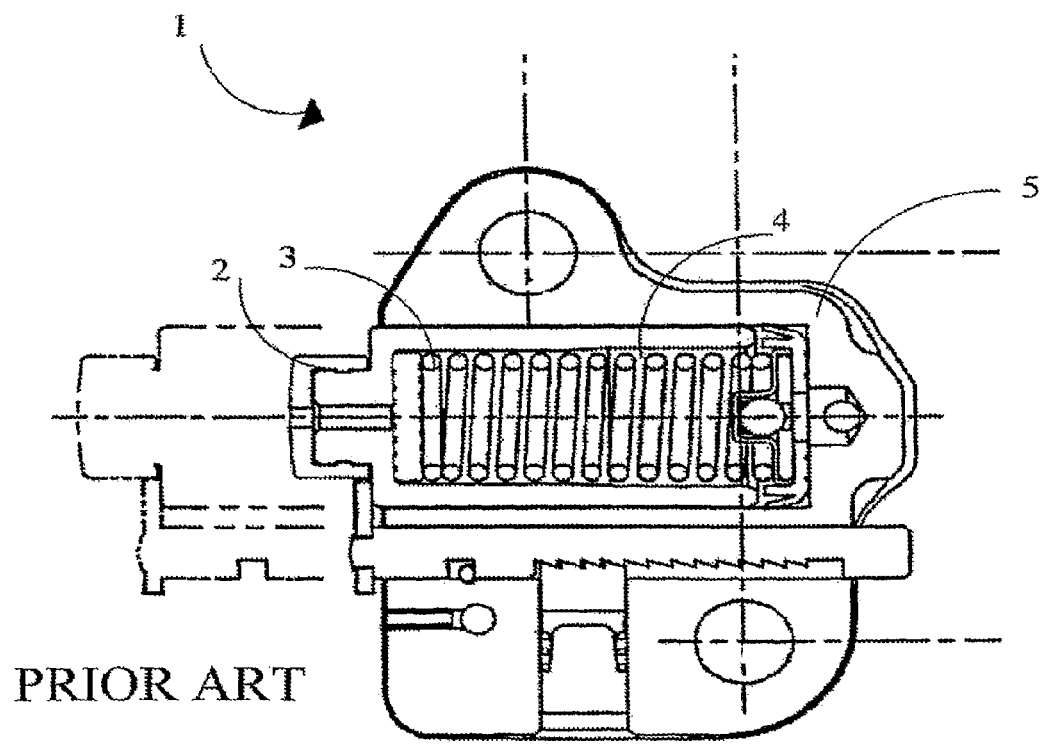
FIG. 4 shows a prior art tensioner that utilizes a ratcheting device to apply a one way force to a pivoting tension lever arm which, in turn, tensions the chain to which it is adjacent.
Figure 5:
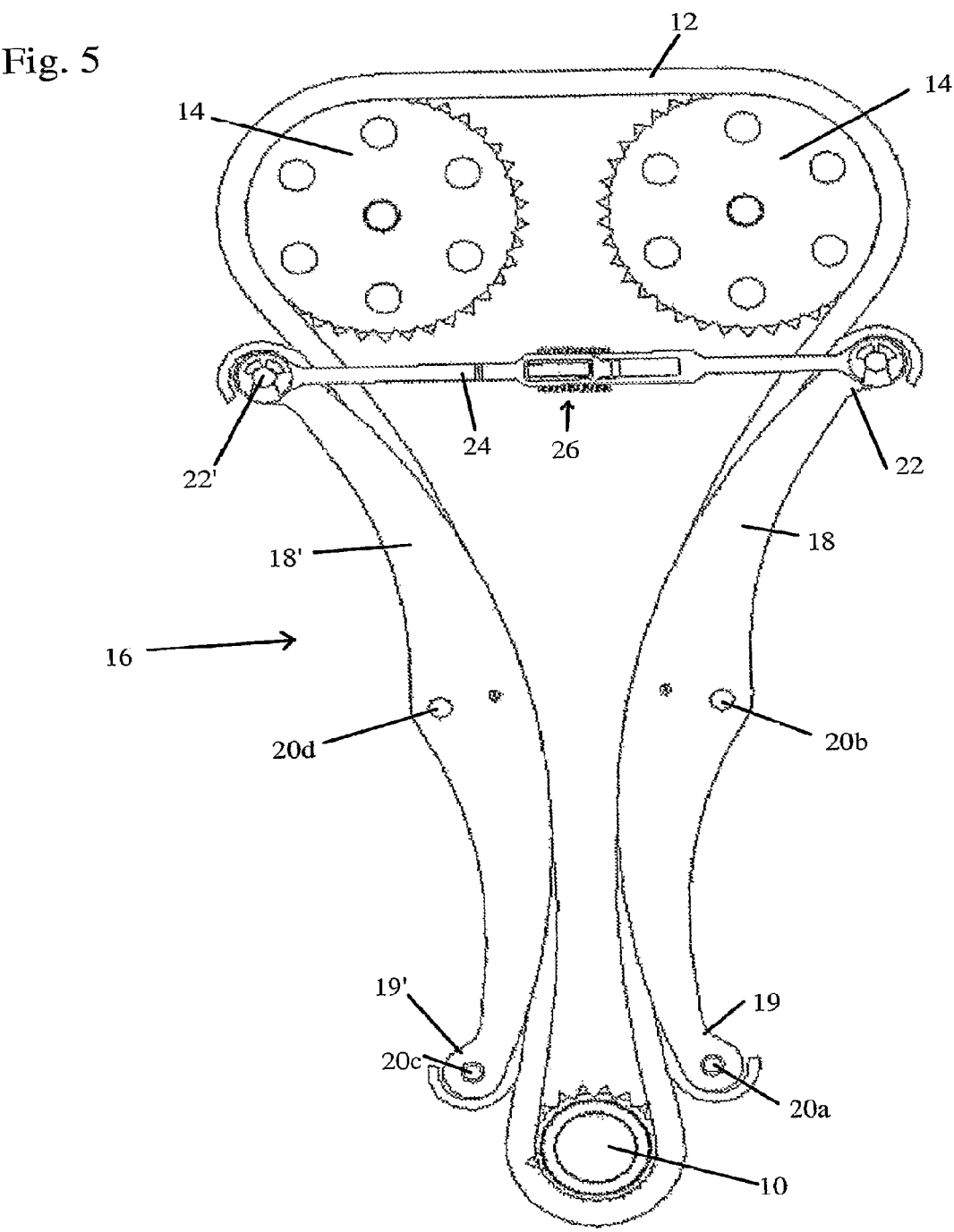
FIG. 5 shows a ratcheting tensioner device that includes the present invention.

A tensioner assembly representative of one that might be used with the force limiting tensioner of the present invention is shown in FIG. 5 in combination with a typical power transmission drive system for an internal combustion engine. A drive sprocket transmits energy from the engine's crank shaft (not shown) via a belt or chain 12 to at least one driven sprocket 14. A chain drive is most common. The driven sprocket(s) 14 typically drive the at least one cam shaft of the internal combustion engine which, in turn, control cylinder valve timing. The strands of chain that mm from either the drive sprocket to the at least one driven sprocket or visa versa vary in tension in response to different engine conditions. During engine operation, one strand is substantially tighter than the other strand, which is considered slack by contrast. In systems where the chain engages toothed sprockets, a tensioning device 16 must be employed to prevent tooth skipping over a wide range of chain tension fluctuations.

In the exemplified power transmission system, the tensioning device 16 is made up of two tensioner brackets 18 and 18'. Each tensioner bracket is pivotally mounted to the engine at a single pivot point 20a, 20b, 20c or 20d, as appropriate. For example, tensioner bracket 18 may be secured at a first end 19 at pivot point 20a or approximately at a mid point 20b along its length, while tensioner bracket 18' might be secured to the engine its first end 19' at pivot point 20c or approximately at a mid point 20d along its length. The second ends of the tensioner brackets 18 and 18', designated as 22 and 22', respectively, are adjustably connected to each other by arm 24. Arm 24 contains a tensioning ratchet 26, which, in this instance is a toothed device designed to tighten in response to excessive slack in the chain or the wearing of the components of the power transmission system over time. The teeth of the ratchet 26 index in only one direction, thus providing a no return function. With sudden, severe spikes or surges in chain tension, the conventional one way clutching mechanism of the ratchet 26 having indexed at least one tooth and since it cannot return to its prior position, could result in the undesirable condition of having the chain over-tensioned.

Figure 6:
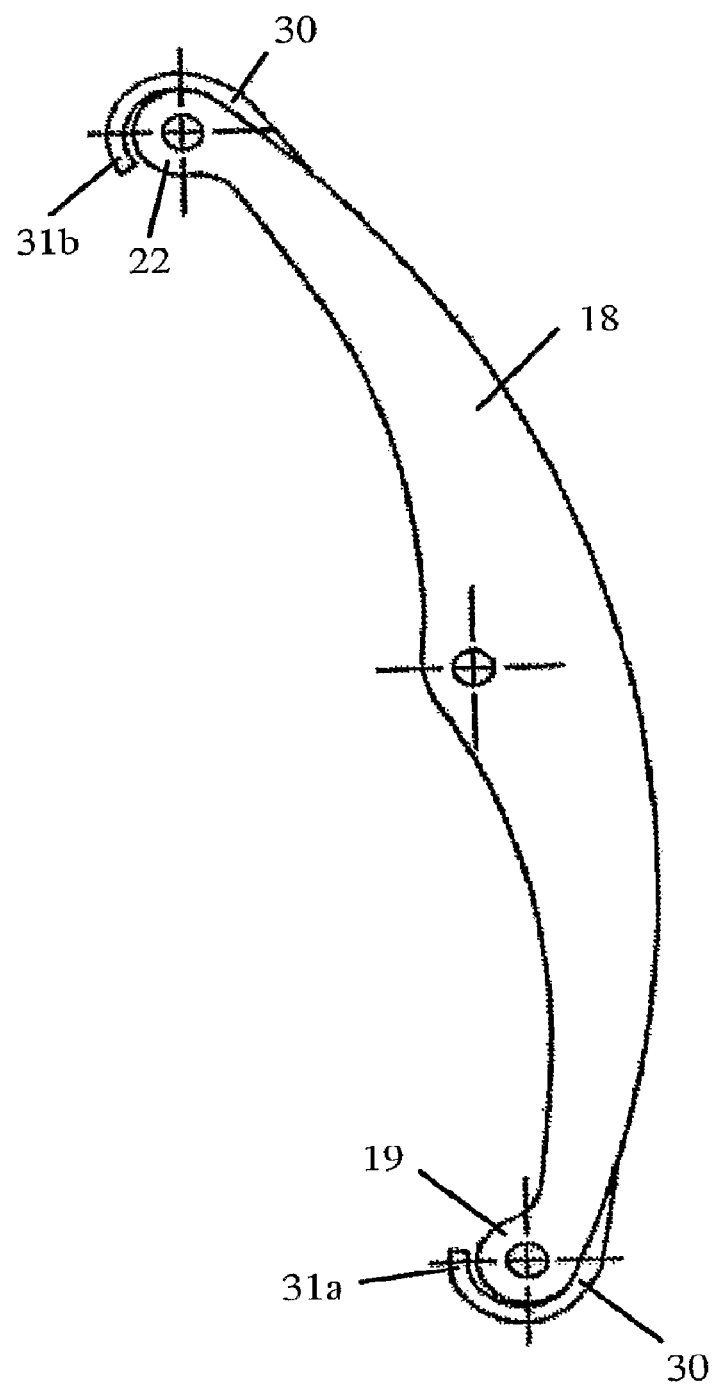
FIG. 6 shows one of the tensioning arms of FIG. 5.
Figure 7:
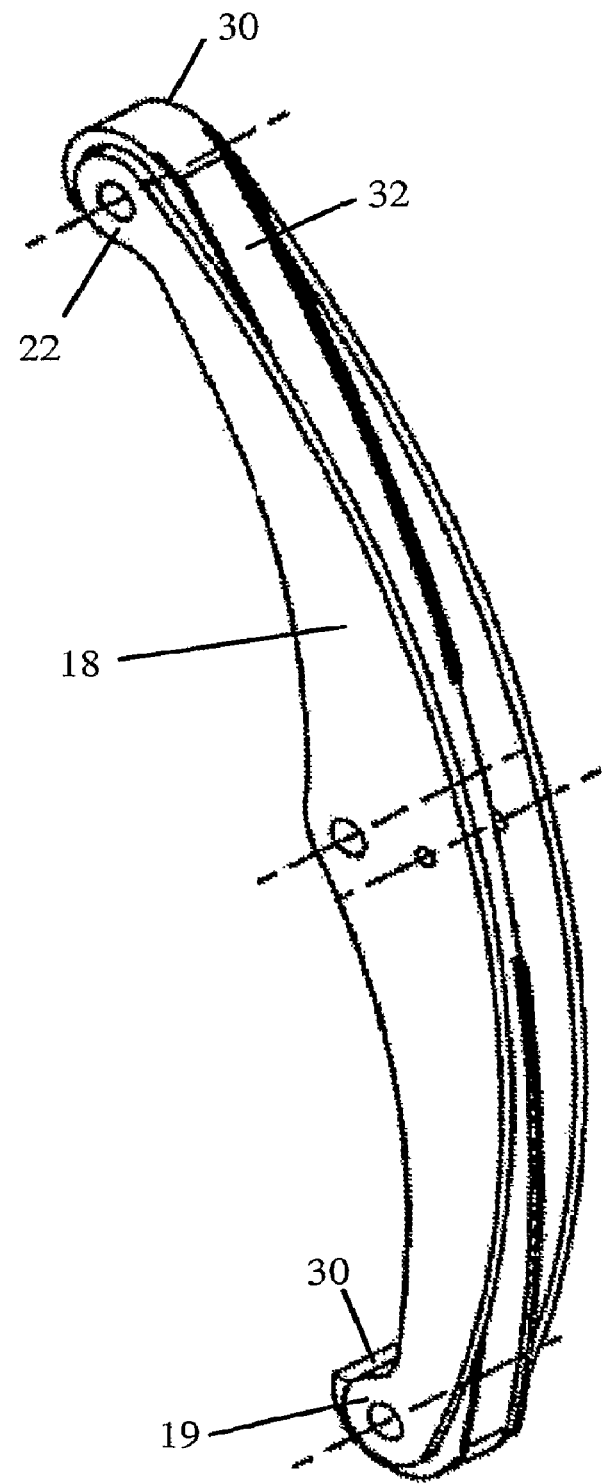
FIG. 7 shows an isometric view of the tensioning arm such as is shown in FIG. 6.

Referring to FIG. 6, a side view of tensioner bracket 18 is shown. An elongated chain guide element 30 having a first end 31a firmly but non-permanently engages around first end 19 of the tensioner bracket 18 and a second end 31b firmly but non-permanently engages around the second end 22 of the tensioner bracket 18. The isometric view of FIG. 7 better shows the chain guide element 30 continuously extending from the first end 19 to the second end 22 of the tensioner bracket 18. The face 32 is the surface against which the chain 12 maintains slideable contact with the chain guide element 30.

Figure 8:
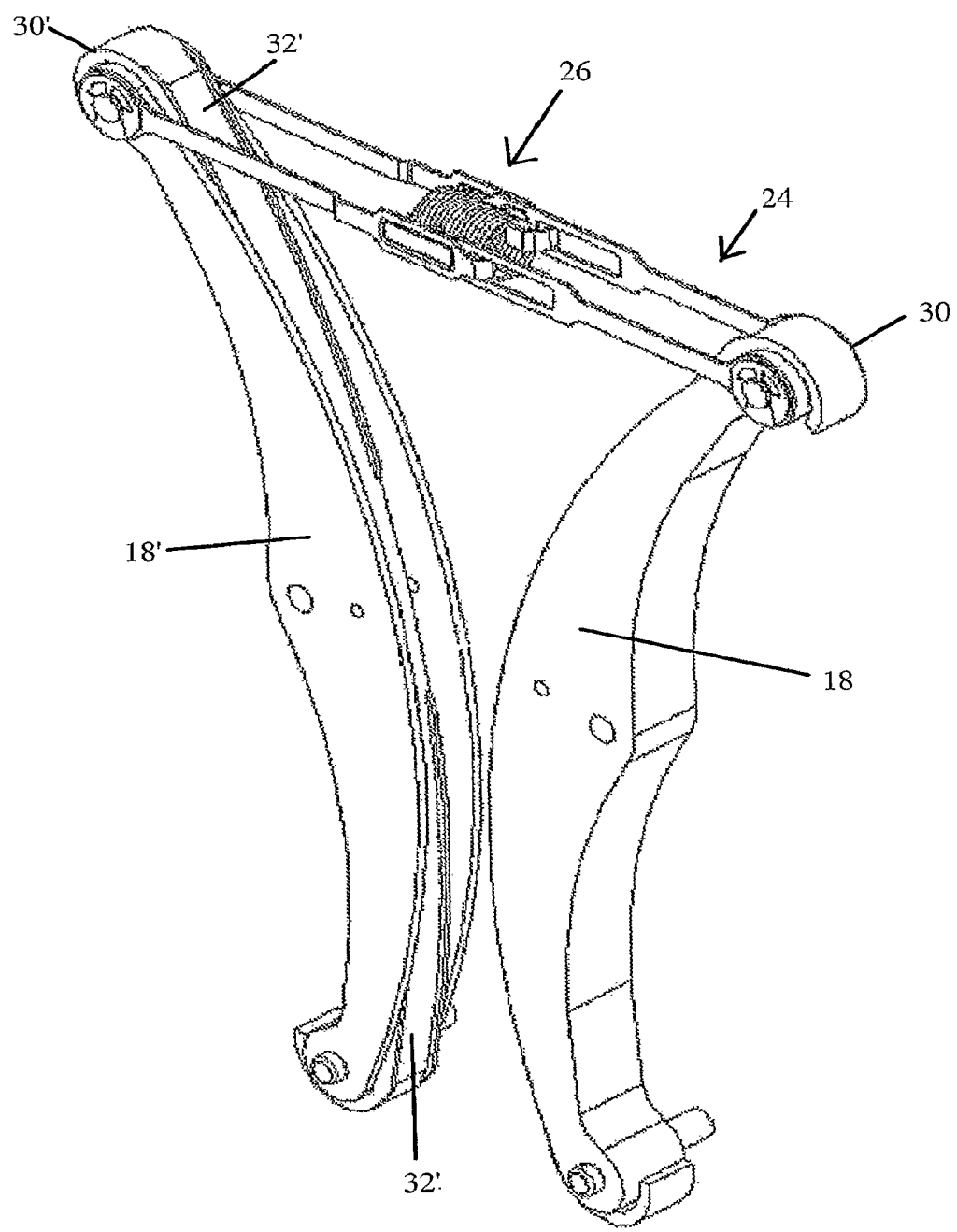
FIG. 8 shows an isometric view of the ratcheting tensioner of FIG. 5.

FIG. 8 shows an isometric view of both tensioner brackets 18 and 18' linked together by arm 24 containing ratchet 26. Although not visible from this view, tensioner bracket 18' also contains a chain guide element 30' having a face 32' which maintains slidable contact with the opposite strand of chain 12.

Figure 9:
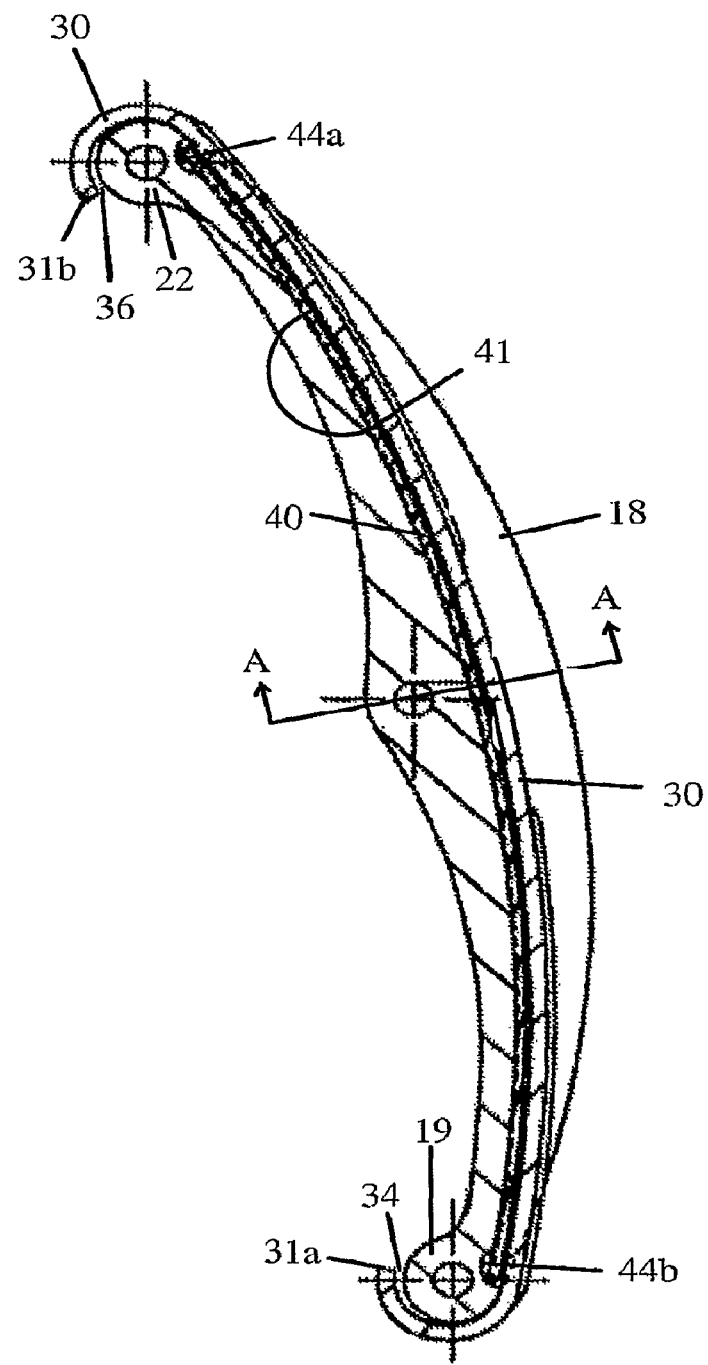
FIG. 9 shows a sectional view of the tensioning arm of FIG. 6.

A longitudinal cross-sectional view of tensioner bracket 18 is shown in FIG. 9. It should be understood that tensioner bracket 18' contains the same components and functions in the same way as will be described hereinbelow with respect to tensioner bracket 18. The ends 31a and 31b of chain guide element 30 are shown as wrapping around the respective first end 19 and second end 22 of tensioner bracket 18. There is a space 34 separating the first end 31a of the chain guide element 30 from the first end 19 of the tensioner bracket 18. A space 36 separates the second end 31b of the chain guide element 30 from the second end 22 of the tensioner bracket 18.

Between the chain guide element 30 and the tensioner bracket 18 is a resilient pad 40. The resilient pad is made from an elastomeric material, such as, for example, nitrile and silicon rubber based materials. The thickness of the resilient pad 40 may vary with the type of material chosen. However, in general, the thickness will range from approximately 2.0 to approximately 7.0 mm. Preferably, the thickness ranges from approximately 2.0 to approximately 5.0 mm, with a range of from approximately 3.0 to approximately 4.0 mm being most preferred.

In an optional embodiment, a support member 41 having an elongated rectangular shape may be located between the resilient pad 40 and the chain guide element 30. It consists of a metallic material that is manufactured to have a bowed shape in its resting state to provide a spring tension pre-load. The thickness of the support member 41 may range from approximately 0.5 to approximately 3.0 mm. Preferably, the range is from approximately 0.7 to approximately 2.0 mm. Most preferably, the thickness of the support member is approximately 1 mm. Each end of support member 41 is loosely secured in a single retention groove, 44a and 44b. Retention groove 44a is located at the second end 22 and on the surface of tensioner bracket 18 under chain guide element 30 and is cut perpendicular to the longitudinal axis of the tensioner bracket. Similarly, retention groove 44b is located at the first end 19 and on the surface of tensioner bracket 18 under chain guide element 30. It is also cut perpendicular to the longitudinal axis of the tensioner bracket. The pre-load spring tension on the support member 41 augments the force that the chain guide element 30 provides to maintain slidable contact with the chain 12 along the length of the face 32 of the chain guide element 30 under mean, or non-peak, chain tension conditions without compressing the resilient pad.

Figure 11:
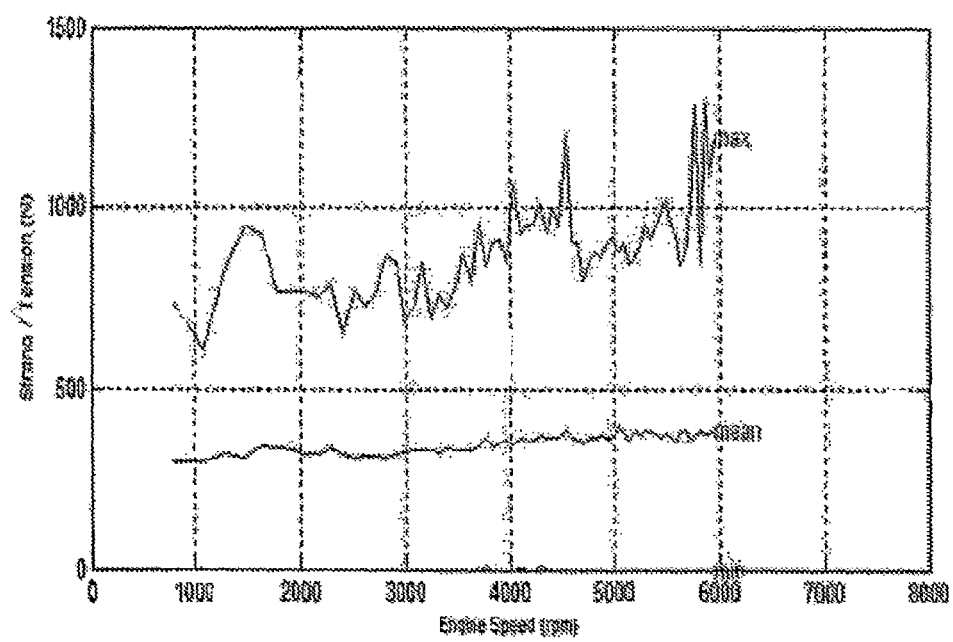
FIG. 11 shows a graph of chain tensions over a wide spectrum of engine RPM's.

FIG. 11 is a graph showing the difference between mean chain strand tension versus spikes or surges in chain tension over a wide range of engine RPM's. While specific tension values result from different engine designs, the concept remains the same. Conditions which affect chain tension include oscillations in the crank shaft, valve train oscillations, the shape and contact length of chain guides and lever arms, tensioner design characteristics such as hydraulic stiffness, spring forces and force angle and chain mass and its stiffness. Regardless of variations in these multiple parameters, every engine design will exhibit spikes or surges in the chain drive of its power transmission system.

Figure 10:
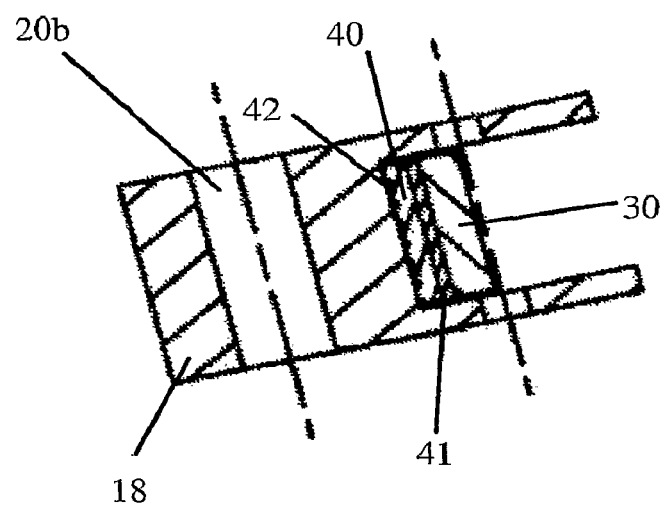
FIG. 10 shows a cross-sectional view of the tensioning arm of FIG. 9 along line A-A.

Referring to FIGS. 9 and 10, when a surge or spike in chain tension is experienced by the tensioning device 16, the increased force will cause the support member 41 to compress the resilient pad 40 into at least one channel 42 located on the surface of the tensioner bracket 18. There may be as many as approximately 15 separate channels or as few as 1 relatively large channel. The resulting biasing of the support member 41 away from the chain 12 and the compression of and flow of the resilient pad 40 into the at least one channel 42 provides an almost instantaneous minimal movement and force absorbing response to the spike or surge in chain tension. After the spike or surge has passed, the support member 41 and the resilient pad 40 will return to their normal operating positions, thereby allowing for a substantially uniform force to tension the chain 12 over a wide range of conditions.

FIG. 10 shows a cross section of the complete tensioner bracket 18, along line A-A of FIG. 9. On the surface of the tensioner bracket 18 under the resilient pad 40 is the at least one channel 42. As already discussed above, this channel provides an area into which the resilient pad 40 may be compressed in response to a high biasing force exerted upon the chain guide element 30 during spikes or surges in the tension of the chain 12. The combination of the ability of the resilient pad 40 to compress and further move into the channel 42 and the resistance of the spring pre-load of the optional support member 41 enables the chain guide element 30 to maintain forceful contact with the chain 12 over a wider range of chain motion, thus providing a substantially more consistent resistive force against the chain 12. The severe fluctuations in the movement of the chain 12 during extreme tension spikes or surges are absorbed by the movement of the resilient pad 40 and support member 41. A consistently more uniform tension is applied by the tensioner device 16 to the chain 12 under a broader range of chain tension fluctuations, including during engine shut down and engine off situations.

During normal operating conditions, the chain guide element 30 is biased toward and in slidable engagement with the chain 12. The spaces 34 and 36 at both ends of the chain guide element 30 may entirely disappear or at least substantially decrease in size. This is due to the normal tendency of the chain guide element 30 to flex toward the chain in addition to the outward force that is applied to the back of the chain guide element by the support member 41 and the resilient pad 40. However, when a spike or surge in chain tension occurs, the combination of the outward biasing force of the support member 41 and resistive force of the resilient pad 40 is overcome, causing the chain guide element 30 to retreat from its normal operating contact position with the chain 12 under low or mean chain tension conditions. The force biasing the chain guide element 30 toward the tensioner bracket 18, causes it to begin to flatten and elongate, thereby expanding the spaces 34 and 36 at both of its ends. The cumulative volume of spaces 34 and 36 allows for a controlled amount of flexural movement in the chain guide element 30. This amount of movement results from the compression of the residual pad 40 and is designed to take up only enough movement in the chain 12 to absorb the chain tension spikes or surges.

It should be understood that this invention is intended to be utilized with a tensioning device for a chain driven power transmission system that employs a ratcheting mechanism.

The drawings and specification have shown and described the present invention in a tensioning system having two tensioning brackets connected to each other at one of their ends by an arm that contains a ratchet, as exemplifying a conventional tensioner. However, the present invention may also be used with any of the hydraulic piston type tensioners described in the background of this specification so long as they utilize a ratcheting mechanism. The type of ratchet mechanism that may be used with this invention is not limited. This invention is capable of use with any chain tensioner ratcheting device.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for a chain driven power transmission system of an internal combustion engine having a ratchet mechanism comprising:
   a) at least one bracket having a first end, a second end and a longitudinal surface facing a strand of the chain;
   b) a longitudinal chain guide element having a chain sliding surface which slidably engages the chain, a first end and a second end, the chain guide element covering the longitudinal surface of the bracket, with the first end of the chain guide element firmly but non-permanently engaged around the first end of the bracket to form a first space therebetween and the second end of the chain guide element firmly but non-permanently engaged around the second end of the bracket to form a second space therebetween;
   c) a first retention groove on and perpendicular to the longitudinal surface of the bracket located in proximity to the first end of the bracket and a second retention groove on and perpendicular to the longitudinal surface of the bracket located in proximity to the second end of the bracket;
   d) an elongated resilient pad extending from a first end of the bracket to a second end of the bracket and located between the chain guide element and the longitudinal surface of the bracket;
   e) a channel on the longitudinal surface of the bracket running between the first retention groove and the second retention groove so that the resilient pad is forcibly displaced within the at least one channel in response to a force exerted on the chain guide element by a spike or surge in the tension of the chain; and
   f) an elongated support member having a first end and a second end located between the chain guide element and the resilient pad, wherein the first end of the elongated support member is loosely secured in the first retention groove and the second end of the elongated support member is loosely secured in the second retention groove allowing for lengthening of the support member when flattened.

2. The tensioner of claim 1 wherein the resilient pad comprises an elastomeric material.

3. The tensioner of claim 2 wherein the elastomeric material is selected from the group consisting of nitrile and silicon rubber.

4. The tensioner of claim 1 wherein the resilient pad ranges in thickness from approximately 2.0 to approximately 7.0 mm.

5. The tensioner of claim 4 wherein the thickness of the resilient pad ranges from approximately 2.0 to approximately 5.0 mm.

6. The tensioner of claim 5 wherein the thickness of the resilient pad ranges from approximately 3.0 to approximately 4.0 mm.

7. The tensioner of claim 1 wherein the thickness of the support member ranges from approximately 0.5 to approximately 3.0 mm.

8. The tensioner of claim 7 wherein the thickness of the support member ranges from approximately 0.7 to approximately 2.0 mm.

9. The tensioner of claim 8 wherein the thickness of the support member is approximately 1 mm.

10. The tensioner of claim 1 comprising from 1 to approximately 15 channels.

11. The tensioner of claim 1 wherein amount of movement of the chain guide element is limited by the total displacement of the combined volumes of the first space between the first end of the bracket and the first end of the chain guide element and the second space between the second end of the bracket and the second end of the chain guide element.

* * * * *